June 18, 1946.  W. J. HARKNESS  2,402,326
SOLAR HEATER
Filed Sept. 22, 1944  2 Sheets-Sheet 1
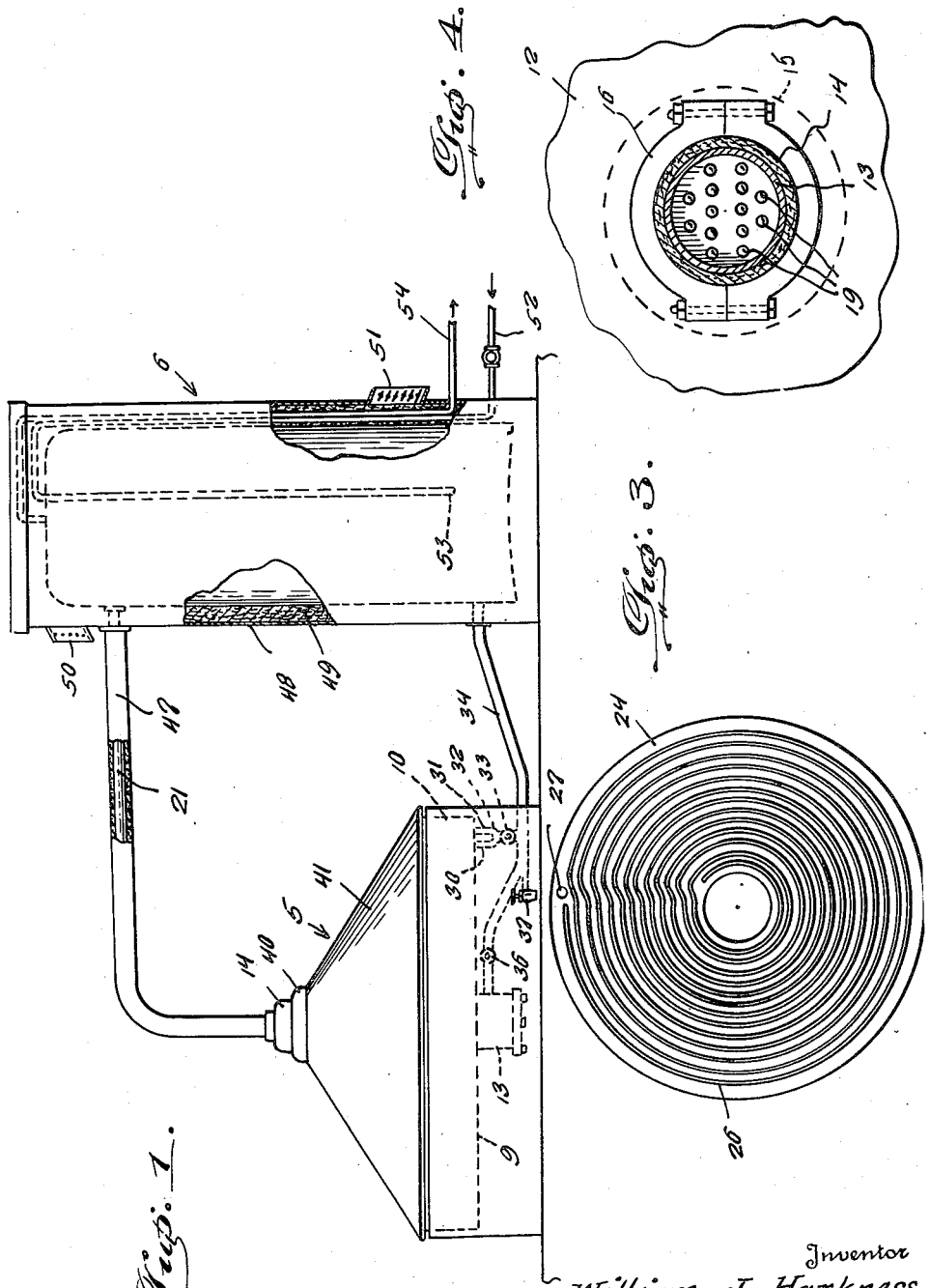
Inventor
William J. Harkness,
By [signatures]
Attorneys

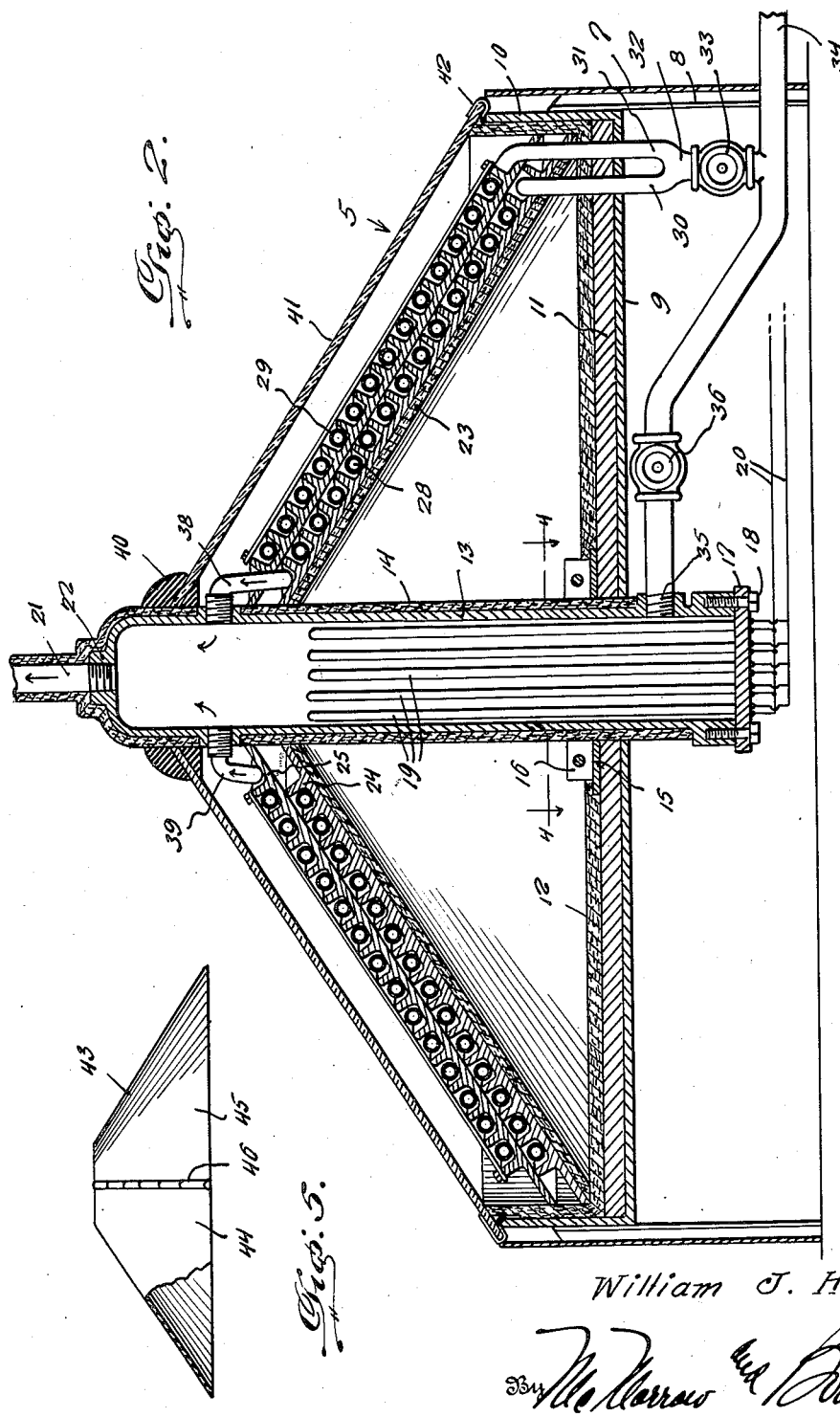

Patented June 18, 1946

2,402,326

UNITED STATES PATENT OFFICE 2,402,326

SOLAR HEATER

William J. Harkness, Miami, Fla.

Application September 22, 1944, Serial No. 555,308

1 Claim. (Cl. 126—271)

The present invention appertains to new and useful improvements in solar heaters such as are used in tropical areas for the heating of water.

The principal object of the present invention is to provide a solar heater especially designed to be set up on a lot or other piece of ground rather than on a roof or building top where the same is ordinarily inaccessible for the purpose of repairs, replacements, etc.

Another important object of the invention is to provide an attractive appearing solar heater, constructed to be placed on the ground where it can be easily reached for the purpose of cleaning, adjustment, and for various other purposes.

Still another important object of the invention is to provide a solar heater of the character described wherein the various parts are readily demountable so that in a short time interval the structure can be changed from one place to another as requirements may demand.

A further object of the invention is to provide a solar heater which, because of its demountability, is capable of being shipped in a compact small space-occupying shipment.

Various other important objects and advantages of the invention shall become apparent to the reader of the following description.

In the drawings:

Figure 1 represents a side elevational view of the apparatus with certain parts in section.

Figure 2 is a fragmentary enlarged vertical sectional view through the heater.

Figure 3 is a top plan view of one of the spirally grooved coil-containing plates.

Figure 4 is a fragmentary horizontal sectional view taken on the line 4—4 of Figure 2.

Figure 5 is a side elevational view of the metal cover with a portion broken away.

Referring to the drawings, wherein like numerals designate like parts, it can be seen that, in Figure 1, numeral 5 generally refers to the improved heater, while numeral 6 generally refers to a tank.

The heater 5 consists of an annular shell 7 inside of which are vertical legs 8 supporting a steel platform 9 having an upstanding circumferential wall 10. Upon this platform 9 is a heavy wooden floor 11 and upon this is a covering 12 of insulation which also extends up the inner side of the side wall 10.

A vertically disposed and cylindrical water receiver 13 extends upwardly through the platform 9, floor 11 and covering 12 and this water receiver has a jacket 14 of insulation. On the wooden floor 11 is an annular plate 15 circumscribing the water receiver 13 and its insulation 14 and resting on this is a sectional clamp 16 for embracing the water receiver 13 and its insulation 14 to hold these parts supported in the position shown in Figure 2.

The lower end of the receiver 13 has a closure plate 17 secured in place by machine screws 18 and extending upwardly from this closure plate 17 and to a substantially high point in the water receiver 13 are electric heating units 19. Current supply wires 20 extend to these heating units 19, as clearly shown in Figure 2.

The insulation 14 extends to the top of the water receiver 13 where a hot water pipe 21 connects thereto, the same being threadedly disposed into an internally threaded boss 22 on the upper end of the receiver 13.

Extending upwardly from the lower portions of the upstanding edge portions of the covering 12 of insulation there is a frusto-conical-shaped body 23 of insulation, the upper portion of which is open to snugly receive the insulating cover 14 of the water receiver 13.

Two frusto-conical-shaped plates 24, 25 are disposed one upon the other and upon the frusto-conical-shaped body 23, each of these plates 24, 25 being formed with a spiral grooveway 26 extending from an opening 27 adjacent its periphery to a point adjacent the open top of the plate.

Disposed in the grooves of the plates 24, 25 are copper tubes 28, 29, respectively. The lower ends of the copper tubes 28, 29 have depending extensions 30, 31, respectively, which are joined together, as at 32, to connect to a shut-off valve 33, which in turn is connected with a water supply pipe 34. This pipe 34 is connected with the water receiver 13, as at 35, and between this connection 35 and the shut-off valve 33 is a cut-off valve 36, which is utilized when the heating elements 19 are not in use. As shown in Figure 1, a drain cock 37 may be employed for the heater.

The upper ends of the coils 28, 29 have upward extensions 38, 39, respectively, which are threadedly disposed into the upper portion of the water receiver 13, thus placing the coils 28, 29 in communication with the receiver 13.

A resilient collar 40 is provided around the upper portion of the water receiver 13 and its cover 14 and this has a circumferentially disposed and inclined slot for the snug reception of the upper edge of a frusto-conical-shaped glass dome 41, which is supported in place by clips 42 on the upper edge of the wall 10.

In the event that the heater is to be out of use for some period of time, a cover generally referred to by the numeral 43 and of some suitable metal may be used to cover the glass dome 41. The cover 43 is of frusto-conical-shape and is made up of sections 44, 45, hinged together, as at 46.

The cold water supply pipe 34 extends from the bottom portion of the tank 6, while the hot water pipe 21 from the top of the heater 5 extends to the upper portion of the tank 6, and this pipe 21 preferably has a covering 47 of some heat insulating material.

The tank 6 consists of an outer shell 48 and a lining 49 of some heating insulating material. To ventilate the material 49, upper and lower ventilating roofs 50, 51 are employed.

Numeral 52 denotes a cold water inlet pipe which extends upwardly in the insulating material 49 and then downwardly to terminate adjacent the lower portion of the tank, as at 53.

Connected to the top of the tank 6 is a hot water pipe 54 which extends downwardly through the insulation 49 and extends outside adjacent the lower portion of the tank, thus utilizing that much of the pipe to assist in heating the corresponding amount of the cold water pipe 52.

It can now be seen that when the cover 43 is off of the glass dome 41, the valve 36 closed and the valve 33 open and with water in the tank 6, the heating of the tubes 28, 29 by sun rays passing through the glass dome 41 will serve to heat water in these tubes 28, 29 which of course will rise, and as this water rises, cool water taking its place will also become heated and in this manner a circulation will be created between the heater 5 and the tank 6.

During inclement weather, where for some reason the tubes 28, 29 must be removed, yet hot water is required, then the valve 33 can be closed and the valve 36 opened and electricity supplied to the heating units 19. Thus, water will be supplied to the water receiver 13, therein heated and allowed to circulate to the tank 6 by way of the hot water pipe 21, as cool water is taken in by way of the pipe 34. If this operation is to be carried on for any appreciable period of time, then the protective cover 43 may be placed to cover the glass dome 41 to protect the same.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A solar heater comprising a base structure, a frusto-conical-shaped support on the base structure, said frusto-conical-shaped support being formed with a spiral grooveway on its upper surface, a water heating tube disposed in said grooveway, a water receiver extending upwardly through the top of the frusto-conical-shaped support, to which the upper end of the tube is connected, a water supply pipe having a connection to the lower end of the tube, an outlet pipe on the upper end of the water receiver, and a glass cover of frusto-conical shape disposed over the said frusto-conical-shaped support and tube.

WILLIAM J. HARKNESS.